US012447637B2

(12) United States Patent
Cauley, Jr. et al.

(10) Patent No.: US 12,447,637 B2
(45) Date of Patent: Oct. 21, 2025

(54) KNIFE HAVING SHEATH AND BOTTLE OPENER

(71) Applicant: AOB Products Company, Columbia, MO (US)

(72) Inventors: Dennis W. Cauley, Jr., Fayette, MO (US); James Tayon, Moberly, MO (US); Anthony Vesich, Columbia, MO (US); Matthew Kinamore, Columbia, MO (US); Curtis Smith, Columbia, MO (US); Josh Neville, Columbia, MO (US); Mark Dalton, Columbia, MO (US)

(73) Assignee: AOB Products Company, Columbia, MO (US)

( * ) Notice: Subject to any disclaimer, the term of this patent is extended or adjusted under 35 U.S.C. 154(b) by 400 days.

(21) Appl. No.: 18/061,661

(22) Filed: Dec. 5, 2022

(65) Prior Publication Data

US 2023/0173697 A1 Jun. 8, 2023

Related U.S. Application Data

(62) Division of application No. 16/927,801, filed on Jul. 13, 2020, now Pat. No. 11,518,053.
(Continued)

(51) Int. Cl.
*B26B 11/00* (2006.01)
*B26B 3/00* (2006.01)
(Continued)

(52) U.S. Cl.
CPC .............. *B26B 11/006* (2013.01); *B26B 3/00* (2013.01); *B26B 29/025* (2013.01); *B67B 7/16* (2013.01)

(58) Field of Classification Search
CPC ......... B26B 29/02; B26B 29/025; B26B 3/03; B26B 3/06; B26B 11/006; B25G 1/10; B25G 1/102; B67B 7/16
See application file for complete search history.

(56) References Cited

U.S. PATENT DOCUMENTS 1,425,704 A 8/1922 Shek
1,457,374 A 6/1923 Lazarus
(Continued)

FOREIGN PATENT DOCUMENTS

AT 7468 U1 4/2005
CH 711489 B1 1/2020
(Continued)

OTHER PUBLICATIONS

Bubba Proteus Ulu Knife, $32.99 online on sportsmansguide.com, review Dec. 2020, 3 pages.
(Continued)

*Primary Examiner* — David B. Thomas
(74) *Attorney, Agent, or Firm* — Stinson LLP

(57) ABSTRACT

A knife, components thereof, a sheath therefor, and associated methods. The sheath may be releasably retainable on the blade by engagement of connection structure of the sheath and blade formed by inserting the blade into the sheath. The blade may include a bottle opener. The knife may include a finger recess adapted to receive a finger of a user when the knife is gripped by the user. The knife may be an ulu knife.

23 Claims, 6 Drawing Sheets

Related U.S. Application Data

(60) Provisional application No. 62/873,487, filed on Jul. 12, 2019.

(51) Int. Cl.
*B26B 29/02* (2006.01)
*B67B 7/16* (2006.01)

(56) References Cited

U.S. PATENT DOCUMENTS

D109,695 S 5/1938 Calencia
2,314,504 A 3/1943 Lifchultz
D144,225 S 3/1946 Teague
2,527,710 A * 10/1950 Davidson, Jr. ........ B26B 29/025 224/232
2,527,711 A * 10/1950 Davidson, Jr. ........ B26B 29/025 224/232
2,545,121 A * 3/1951 Szopa ........ B26B 3/06 224/232
2,617,187 A * 11/1952 Hopta ........ B26B 1/04 7/118
2,618,057 A * 11/1952 Gibson ........ B26B 29/025 224/232
2,717,442 A * 9/1955 Smith ........ A01B 1/022 224/232
2,793,434 A * 5/1957 Wigington ........ B26B 29/025 224/232
2,903,171 A * 9/1959 Rutledge, Jr. ........ B26B 29/025 224/232
3,246,813 A * 4/1966 Miller ........ B26B 29/025 30/162
D220,598 S 4/1971 Meszaros
3,853,283 A 12/1974 Croce et al.
3,992,776 A * 11/1976 Koppe ........ B26B 3/06 224/232
D249,994 S 10/1978 Hall
D263,112 S 2/1982 Ressel
4,404,747 A * 9/1983 Collins ........ B26B 29/025 224/232
4,502,218 A * 3/1985 Carter ........ B24D 15/081 30/139
4,558,516 A * 12/1985 Collins ........ B60R 22/32 224/232
4,574,479 A 3/1986 Gramann
4,718,200 A * 1/1988 Miquelot ........ A61D 19/04 76/82
4,817,221 A 4/1989 Ryan
4,835,863 A * 6/1989 Salandre ........ B26B 29/025 224/232
4,854,044 A * 8/1989 Collins ........ B26B 29/025 30/151
4,856,192 A * 8/1989 Collins ........ B26B 29/025 224/232
4,942,663 A * 7/1990 Ray, Sr. ........ B26B 29/025 30/162
4,964,554 A * 10/1990 Collins ........ B26B 3/06 224/232
4,998,350 A * 3/1991 Thompson ........ B26B 29/025 224/232
5,092,046 A * 3/1992 Collins ........ B26B 29/025 30/162
D330,665 S 11/1992 Neuendorf
5,211,322 A * 5/1993 Nealy ........ B26B 29/025 224/232
5,297,341 A * 3/1994 Collins ........ B26B 3/06 30/162
D352,426 S 11/1994 Tucker
D353,989 S 1/1995 Watson
5,377,626 A 1/1995 Kilsby et al.
5,647,130 A * 7/1997 Collins ........ B26B 29/025 30/162
5,711,079 A * 1/1998 Fischer ........ B26B 5/00 30/342
D392,078 S 3/1998 Courts
5,762,029 A 6/1998 Dubois et al.
5,794,347 A * 8/1998 Serpa ........ B26B 29/025 30/162
D409,270 S 5/1999 Balolia
5,915,793 A * 6/1999 Serpa ........ B26B 29/025 30/162
5,926,959 A * 7/1999 Collins ........ B26B 29/025 30/162
6,205,667 B1 3/2001 Glesser
D457,790 S 5/2002 Wang et al.
6,442,843 B1 * 9/2002 Jue ........ B26B 3/06 30/162
D475,591 S 6/2003 Luquire
6,571,665 B2 * 6/2003 Julien ........ B23D 65/00 76/112
6,792,893 B1 9/2004 Quintero et al.
6,851,215 B2 2/2005 Conrad
6,925,967 B1 8/2005 Woodruff
7,040,257 B2 5/2006 Waxman et al.
7,080,456 B2 * 7/2006 Wu ........ B26B 3/06 30/162
7,131,401 B2 11/2006 Huff et al.
7,207,296 B2 4/2007 DiDonato
D572,563 S 7/2008 McRoberts et al.
D612,694 S 3/2010 Eide et al.
7,784,728 B2 8/2010 Shi
D624,793 S 10/2010 Coursey
D640,105 S 6/2011 Benz
8,069,570 B2 12/2011 Taylor et al.
D662,787 S * 7/2012 Holmes ........ D7/649
8,251,020 B2 8/2012 Matthews
8,256,384 B2 9/2012 Wheeler et al.
8,256,385 B2 9/2012 Goldenberg
8,347,825 B2 1/2013 Lopez et al.
D681,081 S 4/2013 Neal, Jr. et al.
8,615,888 B2 * 12/2013 Catalano ........ B26B 29/02 30/340
D730,145 S 5/2015 Eriksson et al.
D742,192 S 11/2015 Morales
9,247,717 B2 2/2016 Hurwitz
D765,319 S 8/2016 Chefez et al.
9,414,572 B2 8/2016 O'Brien et al.
9,717,218 B2 8/2017 O'Brien et al.
9,765,535 B2 * 9/2017 Montgomery ........ B26B 11/006
9,770,837 B2 * 9/2017 Heine ........ A45F 5/021
D811,837 S 3/2018 Brandes
9,919,435 B1 * 3/2018 Enguita ........ B26B 5/006
D832,072 S 10/2018 McGinnis
D833,843 S 11/2018 Stahle, Jr.
10,363,675 B2 7/2019 Robinson et al.
10,369,687 B2 * 8/2019 Levand ........ B25G 3/14
10,420,327 B2 9/2019 Zhu et al.
10,456,941 B1 * 10/2019 Spae ........ B26B 29/00
D873,708 S 1/2020 Paik et al.
10,582,700 B2 3/2020 Vilardi et al.
10,702,084 B2 7/2020 Knapp
D903,040 S 11/2020 Dark, II
D911,795 S 3/2021 Su
11,059,191 B2 * 7/2021 Spae ........ B26B 3/04
11,059,192 B1 * 7/2021 Spae ........ B26B 29/025
11,123,885 B1 * 9/2021 Perez-Espartero ........ B26B 9/00
11,134,657 B2 10/2021 Tang et al.
D953,818 S 6/2022 Turner
11,518,053 B2 12/2022 Cauley, Jr. et al.
2004/0237906 A1 12/2004 Waxman et al.
2006/0112565 A1 * 6/2006 Moser ........ B26B 3/06 30/162
2006/0162674 A1 7/2006 Neiser
2006/0162675 A1 7/2006 Ghalebi et al.
2006/0201450 A1 9/2006 Jordan et al.
2006/0266300 A1 11/2006 Perkitny
2010/0302767 A1 12/2010 Mattheis
2014/0251098 A1 9/2014 Qian
2017/0232604 A1 * 8/2017 Levand ........ B25G 3/36 15/143.1
2017/0341252 A1 * 11/2017 Hogue ........ A45F 5/02
2018/0169852 A1 * 6/2018 Fryer-Biggs ........ B25G 1/102

(56) References Cited

U.S. PATENT DOCUMENTS

| | | | |
|---|---|---|---|
| 2018/0200903 A1 | 7/2018 | Robinson et al. | |
| 2018/0207827 A1* | 7/2018 | Hsieh | B26B 29/025 |
| 2019/0054642 A1 | 2/2019 | Wu | |
| 2019/0216244 A1* | 7/2019 | Knapp | A47G 21/08 |
| 2019/0351570 A1 | 11/2019 | Siffermann | |

FOREIGN PATENT DOCUMENTS

| | | | |
|---|---|---|---|
| CN | 108858292 | A | 11/2018 |
| EM | 002107078-0004 | | 9/2012 |
| JP | D1370729 | | 10/2009 |
| KR | 20140081637 | A | 7/2014 |
| MY | 06-321-0101-0001 | | 4/2007 |
| TW | M541937 | U | 5/2017 |

OTHER PUBLICATIONS

Bubba Blade Proteus Ulu Knife, Item No. 1989606, $39.95, online on Smokey Moutain Knife Works, smkw.com, review by David P. on Nov. 30, 2020, 3 pages.

Amco 4.9" Mezzaluna with Silicone Handle. Date: Feb. 26, 2010. [online]. [Site visited Sep. 24, 2024]. Available from Internet URL: https: //www.amazon.com/dp/BOOOY52CIO/ (Year: 2010).

Checkered Chef Mezzaluna Knife. Date: Jun. 23, 2017. [online]. [Site visited Sep. 24, 2024]. Available from Internet URL: https://www.amazon.com/Checkered-Chef-Mezzaluna-Chopper-Vegetables/dp/B07358FG4G/ (Year: 2017).

Bubba Ulu Knife with Non-Slip Grip Handle. Date: Jan. 1, 2020. [online]. [Site visited Sep. 24, 2024]. Available from Internet URL: https://www.amazon.com/B U B BA-Non-Sli p-Handle-Curved-Integrated/dp/B07YN H22WV (Year: 2020).

* cited by examiner

KNIFE HAVING SHEATH AND BOTTLE OPENER

CROSS-REFERENCE TO RELATED APPLICATION

This application claims the benefit of U.S. Provisional Application No. 62/873,487, filed Jul. 12, 2019, the entirety of which is hereby incorporated herein by reference.

FIELD

The present disclosure generally relates to cutting implements, and more particularly to knives.

BACKGROUND

Many types of knives are used for various tasks. Knives having different types of blades are used in different circumstances. A user may own a variety of knives having blades ranging from small to large in size, and having different blade features, such serration, flexibility, etc.

SUMMARY

In one aspect, a knife assembly comprises a knife including a handle and a blade. The blade has a cutting edge. The sheath defines a pocket in which the blade is receivable for protecting the cutting edge. The blade comprises sheath engagement structure, and the sheath comprises blade engagement structure. The blade engagement structure is configured to engage the sheath engagement structure for releasably retaining the blade in the sheath pocket. At least one of the blade engagement structure or the sheath engagement structure includes an abutment surface that, when the blade is in the sheath pocket, faces away from the handle and is located to abut the other of the blade engagement structure or the sheath engagement structure to obstruct movement of the sheath away from the handle to releasably retain the blade in the sheath pocket.

In another aspect, a knife for removing a bottle cap from a bottle comprises a handle and a blade connected to the handle. The blade includes a cutting edge and a bottle opener. The bottle opener comprises a cap receiving opening, a fulcrum portion, and a prying portion. The fulcrum portion and prying portion are arranged with respect to the cap receiving opening such that the fulcrum portion and prying portion are engageable with the bottle cap while the bottle cap is received in the cap receiving opening. The blade is pivotable about the fulcrum portion while the bottle cap is received in the cap receiving opening and in engagement with the fulcrum portion to pry the bottle cap off the bottle with the prying portion.

In yet another aspect, an ulu knife comprises a handle including a grip. The grip has an upper side, a lower side, a forward side, a rearward side, and opposite left and right ends. The handle has a length extending between the opposite left and right ends. The ulu knife includes a blade connected to the handle and extending downward away from the grip to a cutting edge below the grip. The blade has a forward face and an opposite rear face. At least one of the left and right ends of the grip includes a finger recess at least partially bounded by a forward wall and a rear wall having the finger recess therebetween. The finger recess is located to receive a thumb of a user's hand while other fingers of said hand grasp the grip with the palm of the hand against the upper side of the grip.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
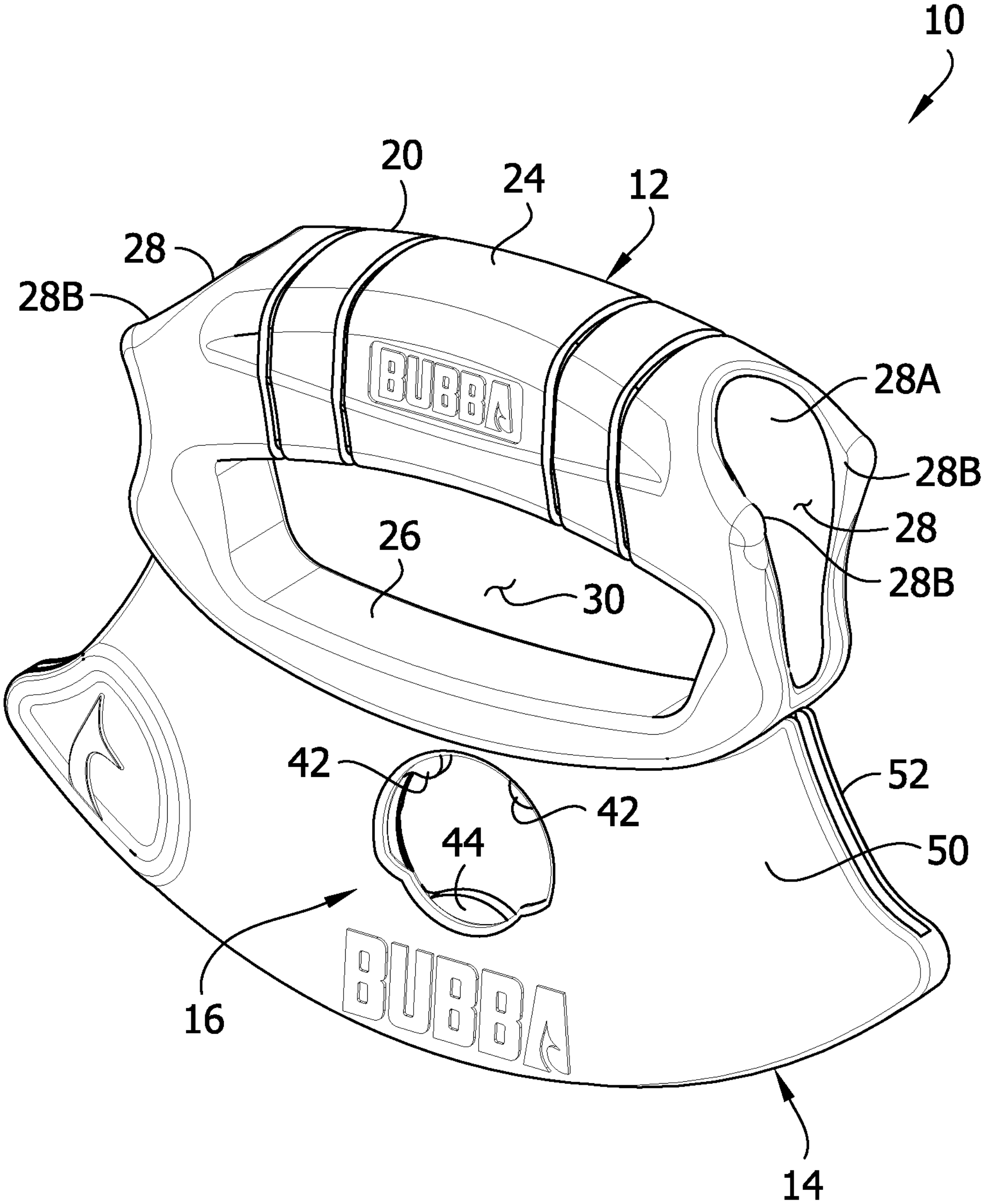
FIG. 1 is a front perspective of a knife assembly including a knife and a sheath.

Referring to FIG. 1, a knife assembly of the present disclosure is indicated generally by the reference number 10. The knife assembly includes a knife 12 and a sheath 14. The knife 12 is of the type commonly referred to as an ulu knife. As will be explained in further detail below, the knife assembly 10 includes a bottle opener 16 and connection structure for securing the sheath 14 in position on the knife 12. It will be appreciated that aspects of the knife can be implemented on other types or configurations of knives (e.g., knives other than ulu knives), without departing from the scope of the present disclosure.

Figure 2:
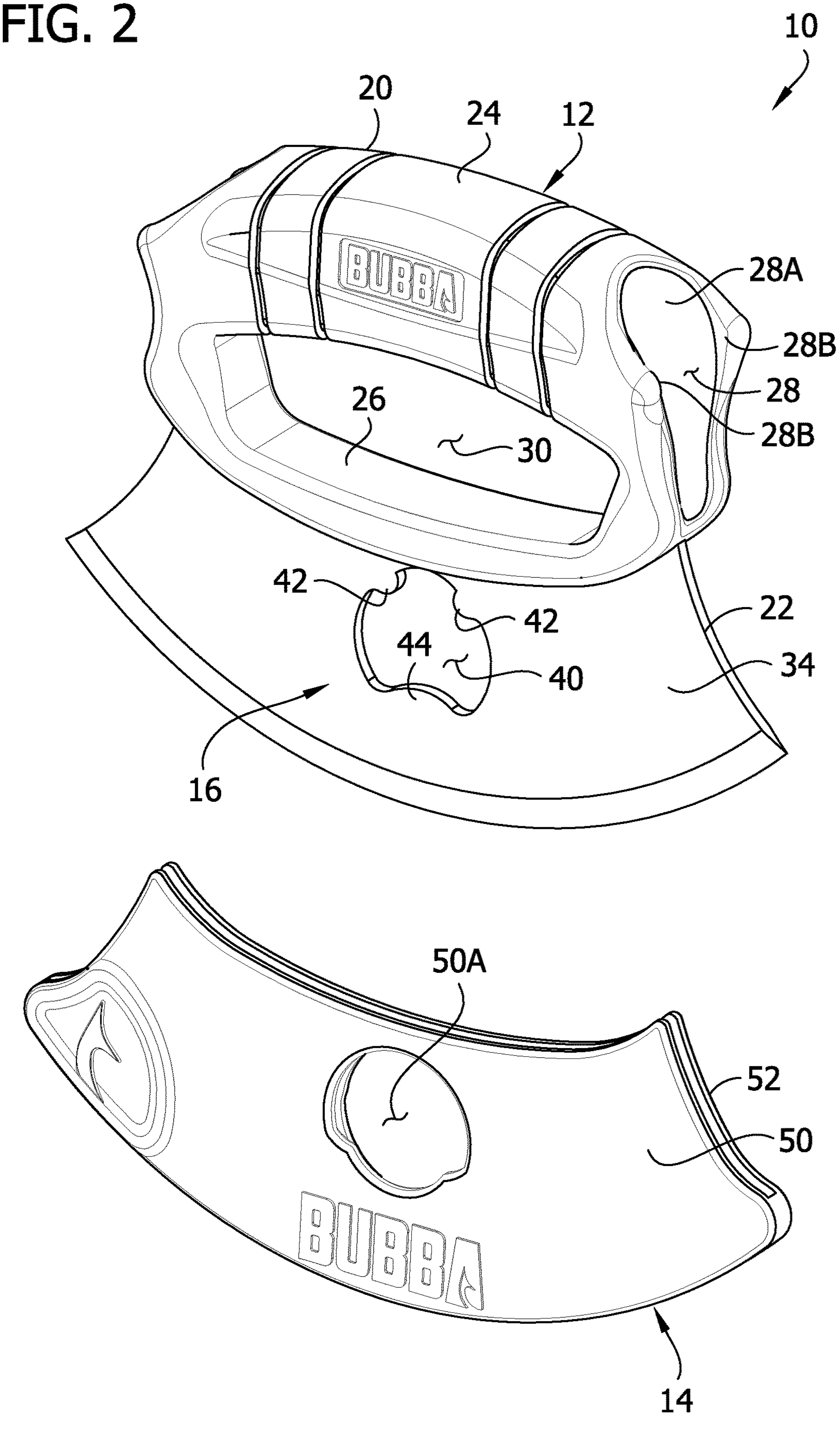
FIG. 2 is a front perspective of the knife and sheath separated from each other.
Figure 3:
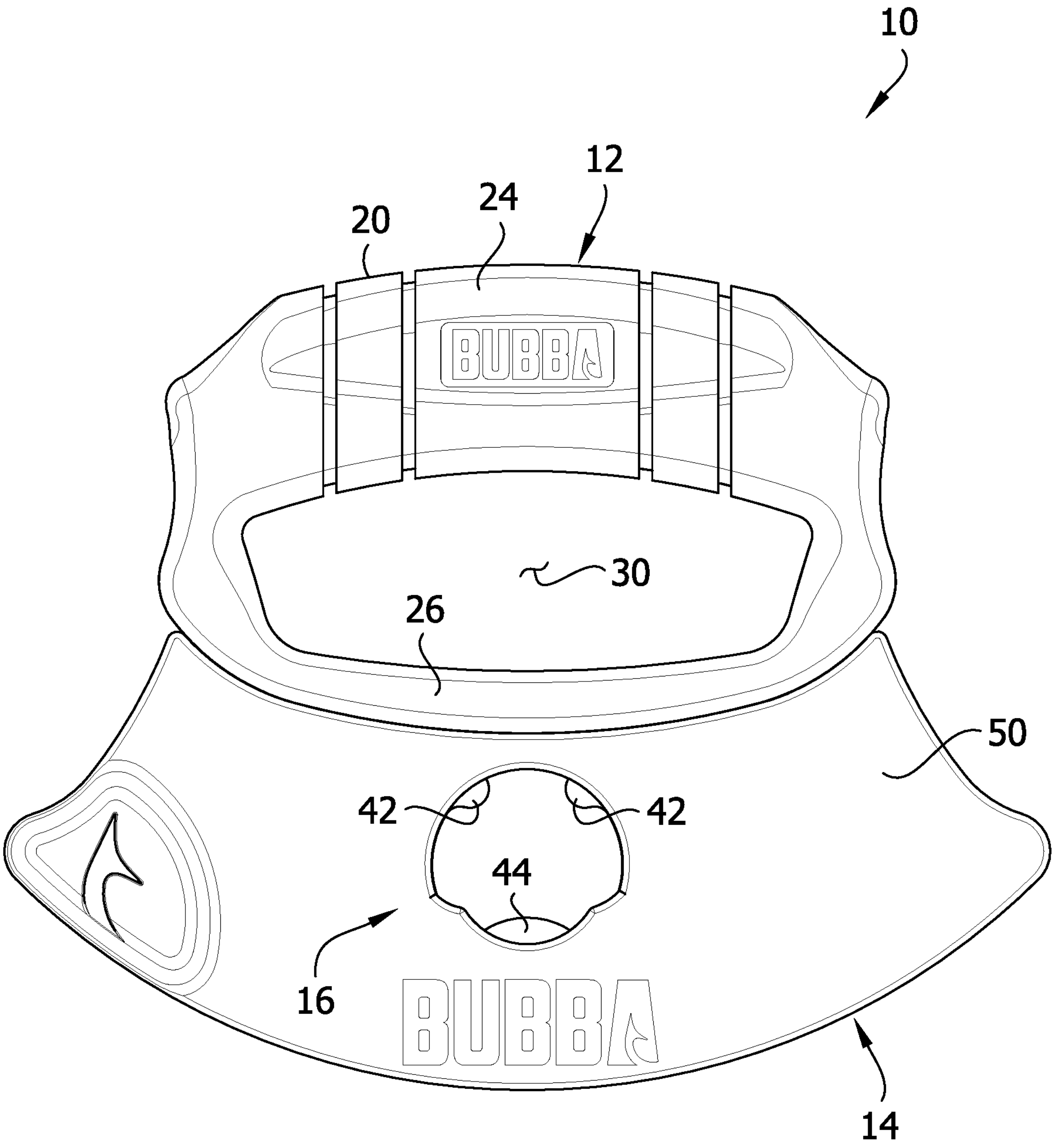
FIG. 3 is a front elevation of the knife assembly.
Figure 4:
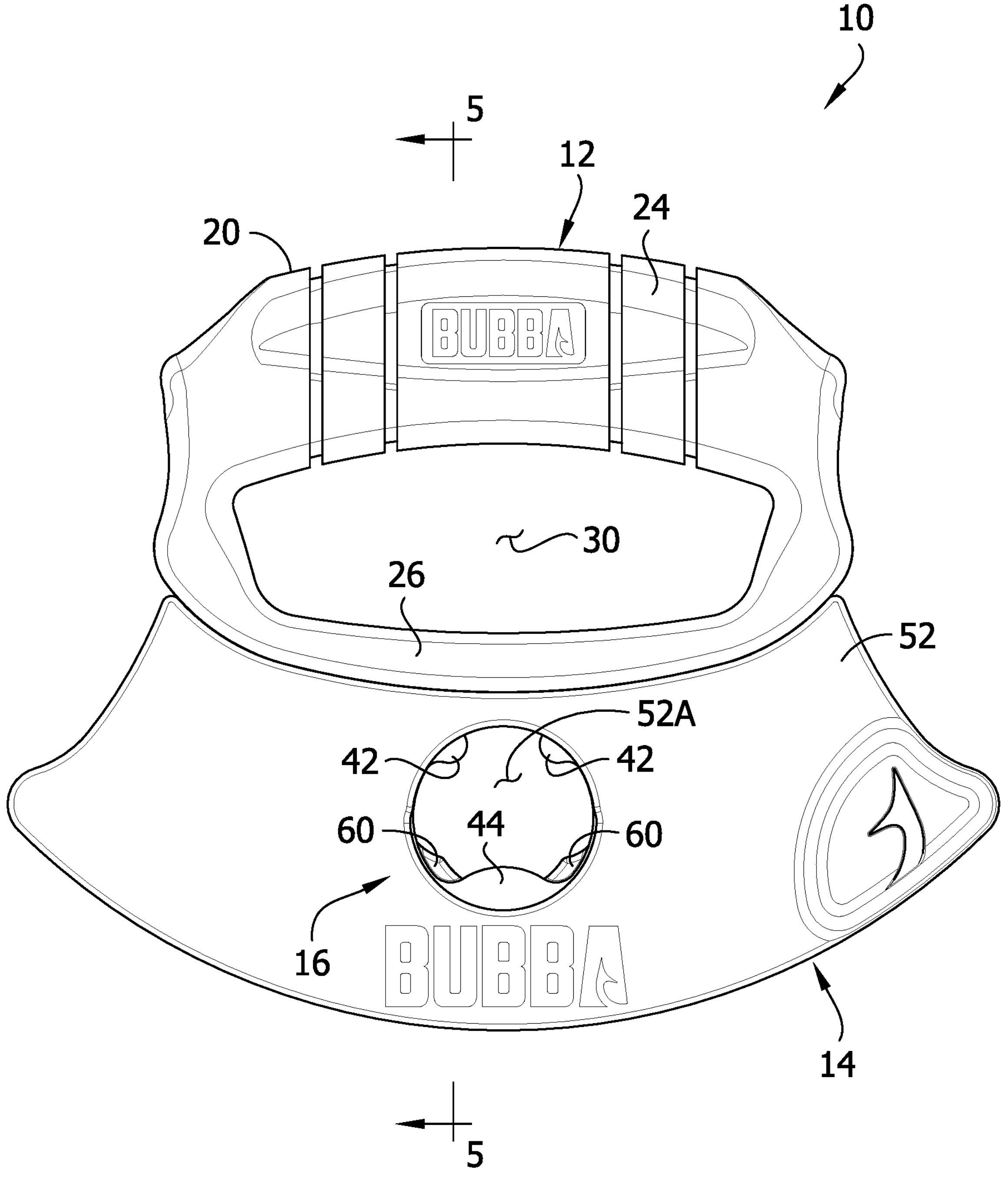
FIG. 4 is a rear elevation of the knife assembly.

The knife 12 includes an upper handle 20 and a blade 22 extending downward below the handle. The handle 20 includes a grip 24 and a blade connecting portion 26. The blade 22 extends downward, away from the connecting portion 26. The grip has an upper side (facing upward in FIG. 2), a lower side (facing the blade connecting portion 26), opposite left and right ends (e.g., defining recesses 28), and a length extending between the left and right ends. The grip 24 includes arms at its opposite ends connecting the grip to the blade connecting portion 26. The grip 24 is configured to receive fingers of a user's hand wrapped on the grip. The two recesses 28 at the opposite ends of the grip are configured to receive a thumb (or other finger) of the user's hand, depending on how the user applies their hand to the handle and in which orientation the user grips the knife 12. Each recess is defined by a finger bed 28A and front and rear side walls 28B defined by protruding bolsters on front and rear sides of the recess. In the illustrated embodiment, the handle 20 defines an opening 30 configured to receive fingers of the user while the palm of the user's hand is against the top of the grip 24 and a thumb of the user rests on one of the finger beds 28A.

Figure 6:
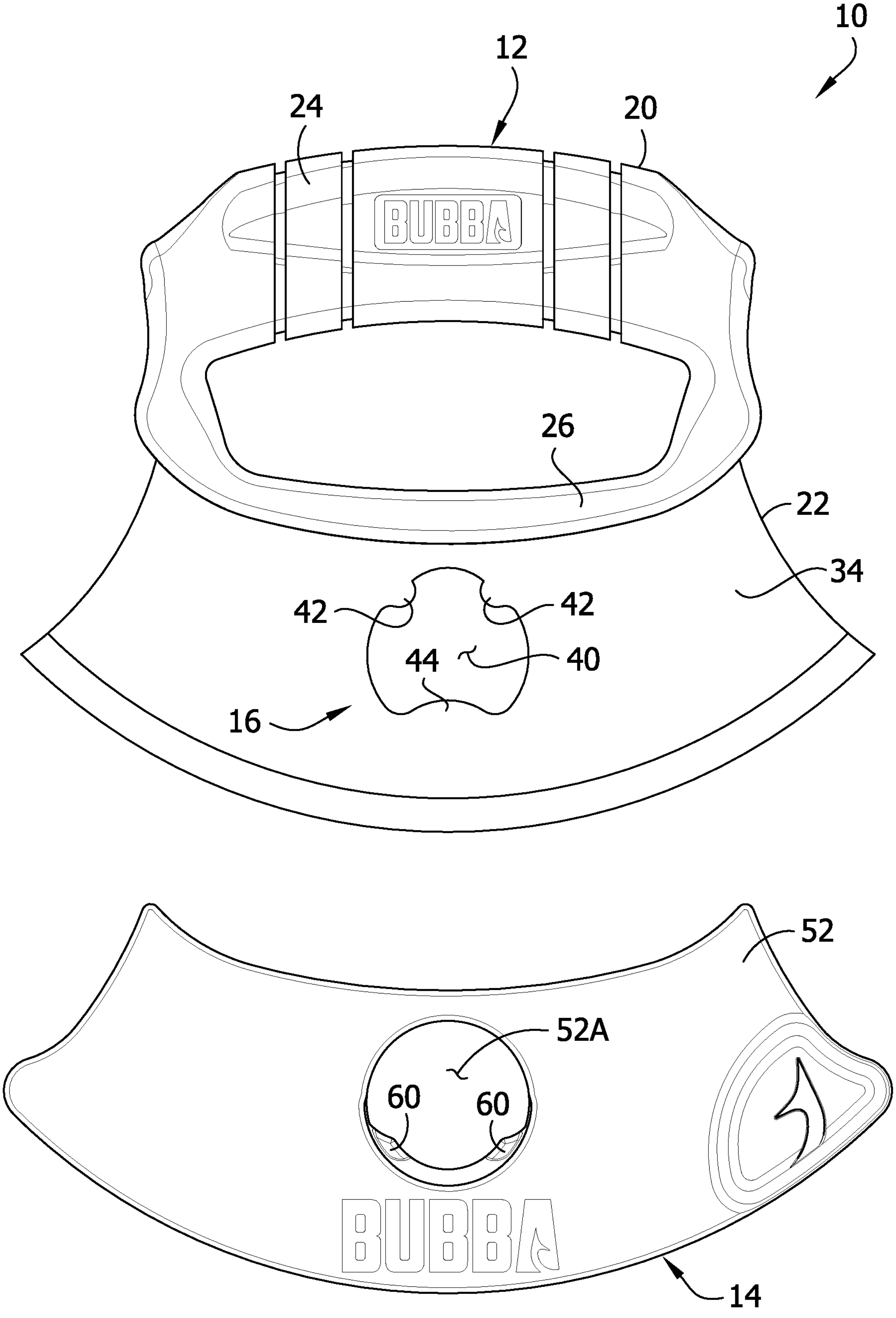
FIG. 6 is a rear elevation of the knife and sheath separated from each other.

The blade 22 includes a main body 34 having an upper or proximal portion connected to the handle 20 and a lower or distal portion defining a cutting edge of the blade spaced from the handle. The cutting edge is generally arcuate or curved and can be moved in a rocking motion or other types of motion for cutting. The blade has a forward face (facing out of the page in FIG. 2) and a rear face (facing into the page in FIG. 6) extending from the handle 20 to the cutting edge. The blade is sharpened on both sides of the blade at the cutting edge.

The bottle opener 16 is configured to remove a cap from a bottle (e.g., beverage bottle having pry off cap). In the illustrated embodiment, the blade includes the bottle opener 16. In the illustrated embodiment, the main body 34 of the blade 22 defines the bottle opener 16. The bottle opener 16 includes an opening 40 in the blade 22 in which a portion of a cap on a bottle is receivable. The bottle opener 16 includes an edge extending around the bottle opener opening. The edge is part of an edge margin extending around the opening and defining a first cap engagement portion 42 and a second cap engagement portion 44. Although the illustrated opening 40 has an edge fully surrounding the opening, it will be appreciated that other configurations (e.g., open sided opening not having fully surrounding edge) can be used without departing from the scope of the present disclosure.

In use, to remove a cap from a bottle, the bottle opener 16 is applied to the bottle such that the cap is received in the opening 40. A cap engagement portion (e.g., portion 42, or portion 44) is engaged with a top side of the bottle cap to serve as a fulcrum portion, and the other of the first or second cap engagement portions 42, 44 is engaged with an underside of a rim of the bottle cap to serve as a prying portion. The handle 20 is then moved by the user so the knife 12 acts as a lever such that the knife pivots about the engagement of the fulcrum portion with the top of the bottle cap, and the prying portion pries the underside of the rim off of the bottle mouth.

In the illustrated embodiment, the first cap engagement portion 42 comprises two protrusions extending into the bottle opener opening toward the second engagement portion 44. The protrusions 42 are spaced from each other along the edge margin of the cap receiving opening 40. The second cap engagement portion 44 comprises a single protrusion extending into the bottle opener opening toward the first cap engagement portion 42. Other configurations can be used without departing from the scope of the present disclosure. For example, the prying portion and fulcrum portion could each comprise two or more protrusions, or could each comprise one protrusion. The prying portion and/or fulcrum portion may lack a protrusion. Moreover, the blade could include material or structure connected to the main body of the blade defining the prying and/or fulcrum portions.

In the illustrated embodiment, the sheath 14 is configured to permit use of the bottle opener 16 when the sheath is installed on the knife 12. The sheath 14 includes a front wall 50 and a rear wall 52 connected to each other at distal or bottom edges of the walls. The sheath 14 defines a blade receiving pocket between the front and rear walls 50, 52. The front and rear walls 50, 52 include respective openings 50A, 52A located to be in registration with the bottle opener opening 40 when the sheath is installed on the blade. To remove a bottle cap when the sheath 14 is on the knife 12, the bottle cap can be inserted through the opening 50A, 52A in the front or rear wall 50, 52 of the sheath 14 to be received in the bottle opener opening 40 and to engage the fulcrum and prying portions 40, 42. The openings 50A, 52A in the front and rear walls 50, 52 are sized such that the fulcrum and prying portions 40, 42 are exposed through the openings 50A, 52A when the sheath 14 is installed on the blade 22 for engagement with a cap to remove the cap.

Figure 5:
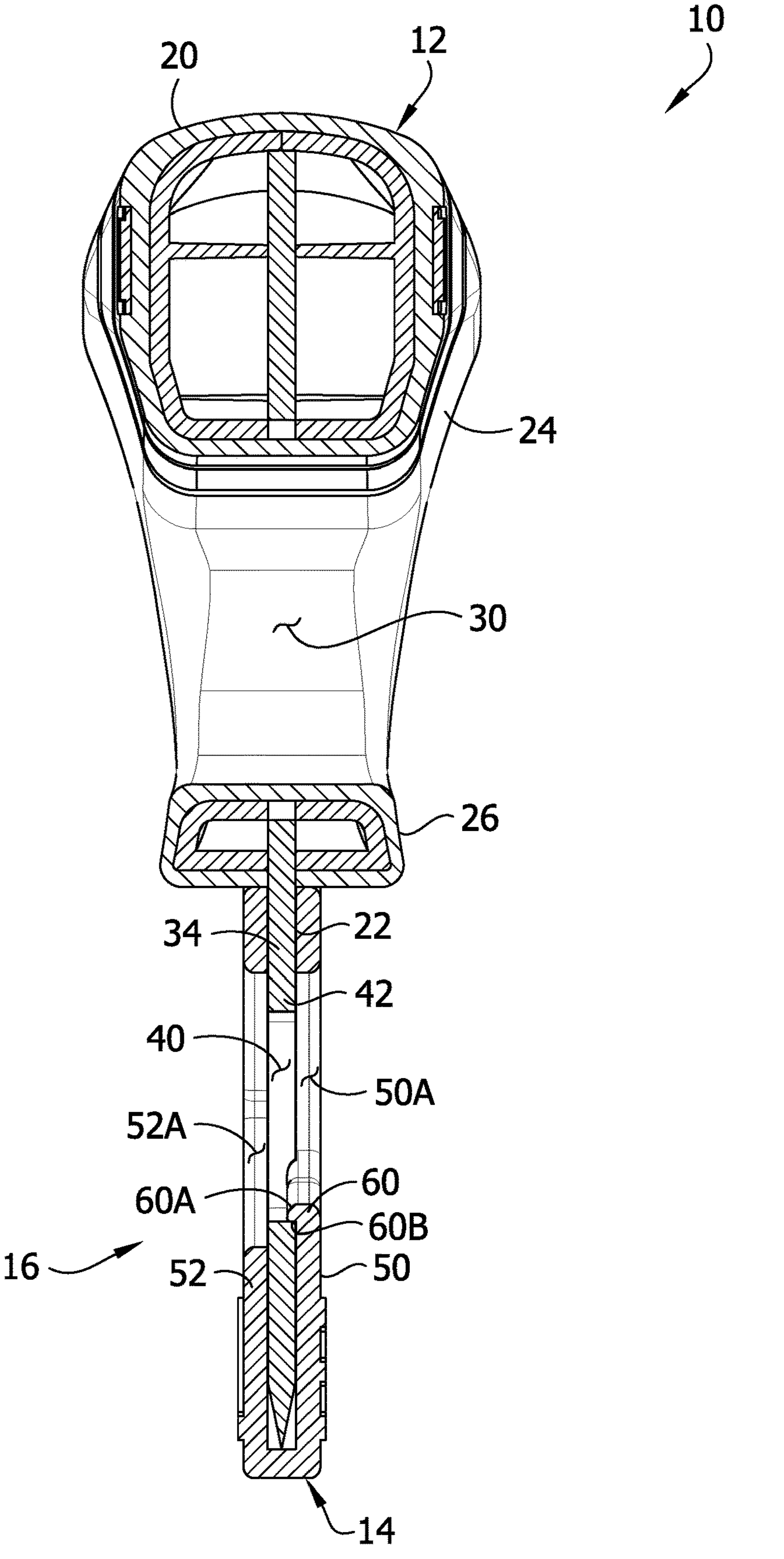
FIG. 5 is a section of the knife assembly taken in a plane including line 5-5 of FIG. 4.

In another aspect of the knife assembly 10, the sheath 14 is configured to be releasably retained on the knife 12. In particular, the sheath 14 includes bottle opener engagement structure (broadly, "connection structure" or "blade engagement structure") configured to engage the bottle opener 16 (broadly, "connection structure" or "sheath engagement structure") to releasably retain the sheath on the blade 22. The bottle opener engagement structure includes at least one catch 60 (in the illustrated embodiment, two catches 60) configured to releasably retain the sheath 14 on the blade 22 by mating with the opening 40 and releasably abutting the edge of the opening. The catches 60 (broadly, "protrusions") protrude from the front wall 50 of the sheath 14 into the blade receiving pocket and are configured to extend into the bottle opener opening 40 when the blade is received in the pocket. The latches each include a cam surface 60A and an abutment surface 60B. As the blade 22 is moved into the pocket, the cam surfaces 60A of the catches 60 slide along a surface of the blade until reaching the bottle opener opening 40, where the catches automatically enter the bottle opener opening to locate the abutment surfaces 60B to engage the edge of the bottle opener opening to obstruct the blade 22 from being inadvertently removed from the sheath 14, as shown in FIG. 5 (covering position of sheath on blade). When the catches 60 are in the opening 40, the abutment surfaces 60B face away from the handle 20 to prevent the sheath from being moved away from the handle. Desirably, the catches 60 are located to automatically enter the bottle opener opening 40 when the blade becomes fully seated in the sheath 14 (e.g., when the upper end of the sheath abuts or is close to the handle, and/or when the cutting edge of the blade is at or near the bottom of the pocket), so the sheath is securely attached to the blade 22. The first catch 60 is received in a lower portion of the bottle opener opening 40 bounded by a concave edge segment adjacent the protrusion 44. The second catch 60 is received in another lower portion of the bottle opener opening 40 bounded by a concave edge segment on the other side of the protrusion 44. The catches 60 assist in centering the sheath 14 lengthwise of the blade 22 and resist movement of the sheath away from the handle 20 and in opposite directions generally parallel to the length of the cutting edge. The sheath 14 can be removed from the blade by pulling the front wall 50 away from the blade 22 with a force sufficient to remove the latches 60 from the bottle opener opening 40 and then sliding the sheath downward or distally off the blade. Alternatively, the sheath 14 can be removed by pulling the sheath away from the handle 20 with sufficient force to dislodge the catches 60 from the bottle opener opening. Desirably, the front wall 50 is flexible and/or the connection of the front wall to the rear wall 52 acts as a living hinge to permit movement of the catches 60 out of the bottle opener opening 40. For example, the sheath could be formed of a flexible or semi-rigid plastic.

Other types and configurations of sheath engagement structure and blade engagement structure can be used without departing from the scope of the present disclosure. For example, the catch could be on the blade and the opening on the sheath. In such a case, the opening would include an abutment surface (e.g., edge portion) facing away from the handle that is located to engage the catch to obstruct movement of the sheath away from the handle and thus resist removal of the sheath from the blade. In other embodiments, other types or configurations of abutment surfaces can be used for retaining the blade in the sheath (e.g., on structure different than a catch or opening).

In a method of using the knife 12, the user removes the sheath 14 from the knife by dislodging the catches 60 from the opening 40 and moving the sheath away from the handle 20 to expose the cutting edge of the blade. While holding the handle 20 in their hand (optionally with thumb in one of the finger recesses 28), the user can push the blade 22 into an item to be cut and/or roll the curved cutting edge against a surface to cut an item on the surface. When the user is finished cutting, the sheath 14 can be reinstalled on the knife 12 by positioning the cutting edge in registration with the mouth of the sheath and moving the knife and/or blade to receive the blade in the pocket of the sheath. As the blade 22 enters the sheath pocket, the catches 60 cam on a face of the blade to temporarily resiliently deform the side wall of the sheath 14, permitting the catches to deflect outward. When the blade 22 is sufficiently received in the sheath pocket, the resilient deformation of the sheath wall causes the catches 60 to automatically enter the opening 40 thereafter obstructing removal of the blade from the sheath. With the sheath 14 on or off the knife 12, the bottle opener 16 can be used to pry a cap off a bottle.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An ulu knife comprising:

a handle including a grip having an upper side, a lower side, a forward side, a rearward side, and opposite left and right ends;

a blade connected to the handle and extending downward away from the grip to a cutting edge below the grip, the blade having a forward face and an opposite rear face;

wherein at least one of the left and right ends of the grip includes a finger recess at least partially bounded by a forward wall and a rear wall having the finger recess therebetween, the finger recess located to receive a thumb of a user's hand while the user's hand grasps the grip with the palm of the user's hand against the upper side of the grip.

2. The ulu knife as set forth in claim 1, wherein the finger recess is a first finger recess and the left end of the grip includes the first finger recess, the right end of the grip including a second finger recess at least partially bounded by a forward wall and a rear wall having the second finger recess therebetween.

3. The ulu knife as set forth in claim 2, wherein the grip includes a first arcuate finger bed bounding the first finger recess and a second arcuate finger bed bounding the second finger recess.

4. The ulu knife as set forth in claim 2, wherein the first and second finger recesses each narrow as the respective finger recesses extend downward.

5. The ulu knife as set forth in claim 2, wherein the first and second finger recesses each include an open top and an open side, the open side of the first finger recess facing in a direction opposite the second finger recess and the open side of the second finger recess facing in a direction opposite the first finger recess.

6. The ulu knife as set forth in claim 2, wherein the handle includes a finger opening configured to receive fingers of the user's hand while the user's hand grasps the grip.

7. The ulu knife as set forth in claim 6, wherein the handle includes a blade connecting portion connected to the blade, the blade connecting portion bounding a lower side of the finger opening and the grip bounding an upper side of the finger opening.

8. The ulu knife as set forth in claim 7, wherein the blade is an ulu blade.

9. The ulu knife as set forth in claim 7, further comprising a bottle opener.

10. The ulu knife as set forth in claim 9, wherein the blade includes the bottle opener.

11. The ulu knife as set forth in claim 10, wherein the bottle opener comprises a cap receiving opening, a fulcrum portion, and a prying portion, the fulcrum portion and prying portion being arranged with respect to the cap receiving opening such that the fulcrum portion and prying portion are engageable with a bottle cap on a bottle while the bottle cap is received in the cap receiving opening, the blade configured to be pivotable about the fulcrum portion while the bottle cap is received in the cap receiving opening and in engagement with the fulcrum portion to pry the bottle cap off the bottle with the prying portion.

12. The ulu knife as set forth in claim 10, in combination with a sheath configured to at least partially cover the blade when the sheathing is in a covering position on the blade, the bottle opener being accessible for removing a bottle cap from a bottle when the sheath is in the covering position on the blade.

13. The ulu knife as set forth in claim 1, wherein the handle includes a finger opening configured to receive fingers of the user's hand while the user's hand grasps the grip.

14. The ulu knife as set forth in claim 13, wherein the handle includes a blade connecting portion connected to the blade, the blade connecting portion bounding a lower side of the finger opening and the grip bounding an upper side of the finger opening.

15. The ulu knife as set forth in claim 14, wherein the blade is an ulu blade.

16. The ulu knife as set forth in claim 14, in combination with a sheath configured to at least partially cover the blade when the sheathing is in a covering position on the blade.

17. The ulu knife as set forth in claim 14, further comprising a bottle opener.

18. The ulu knife as set forth in claim 17, wherein the blade includes the bottle opener.

19. The ulu knife as set forth in claim 18, wherein the bottle opener comprises a cap receiving opening, a fulcrum portion, and a prying portion, the fulcrum portion and prying portion being arranged with respect to the cap receiving opening such that the fulcrum portion and prying portion are engageable with a bottle cap on a bottle while the bottle cap is received in the cap receiving opening, the blade configured to be pivotable about the fulcrum portion while the bottle cap is received in the cap receiving opening and in engagement with the fulcrum portion to pry the bottle cap off the bottle with the prying portion.

20. The ulu knife as set forth in claim 17, in combination with a sheath configured to at least partially cover the blade when the sheathing is in a covering position on the blade, the bottle opener being accessible for removing a bottle cap from a bottle when the sheath is in the covering position on the blade.

21. The ulu knife as set forth in claim 1, wherein the grip includes an arcuate finger bed bounding the finger recess.

22. The ulu knife as set forth in claim 1, wherein the finger recess narrows as the finger recess extends downward.

23. The ulu knife as set forth in claim 1, wherein the finger recess includes an open top and an open side facing outward from said left or right end of the grip.

* * * * *